May 27, 1930.  R. L. GROSE  1,760,490
MANURE SPREADER
Filed April 11, 1928   2 Sheets-Sheet 1
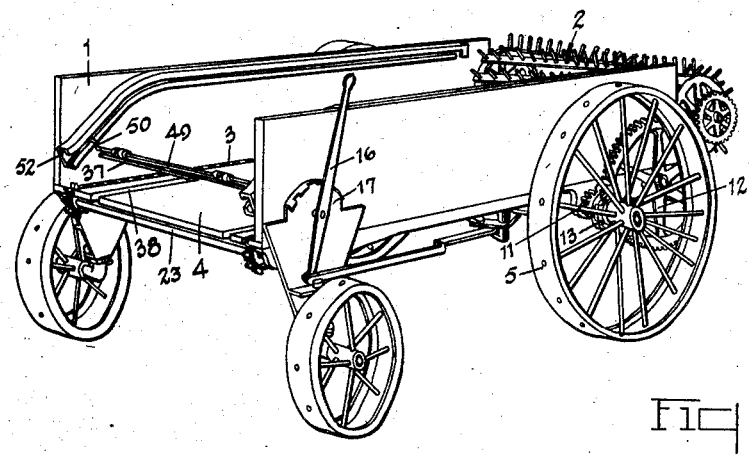
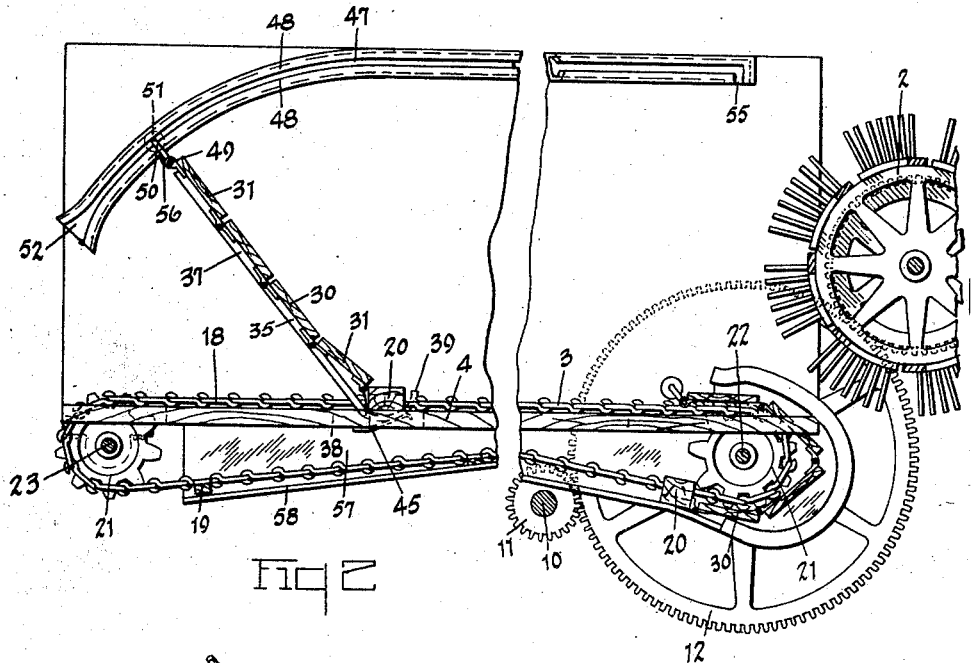
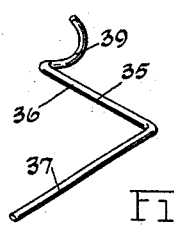
Inventor
Ralph L. Grose

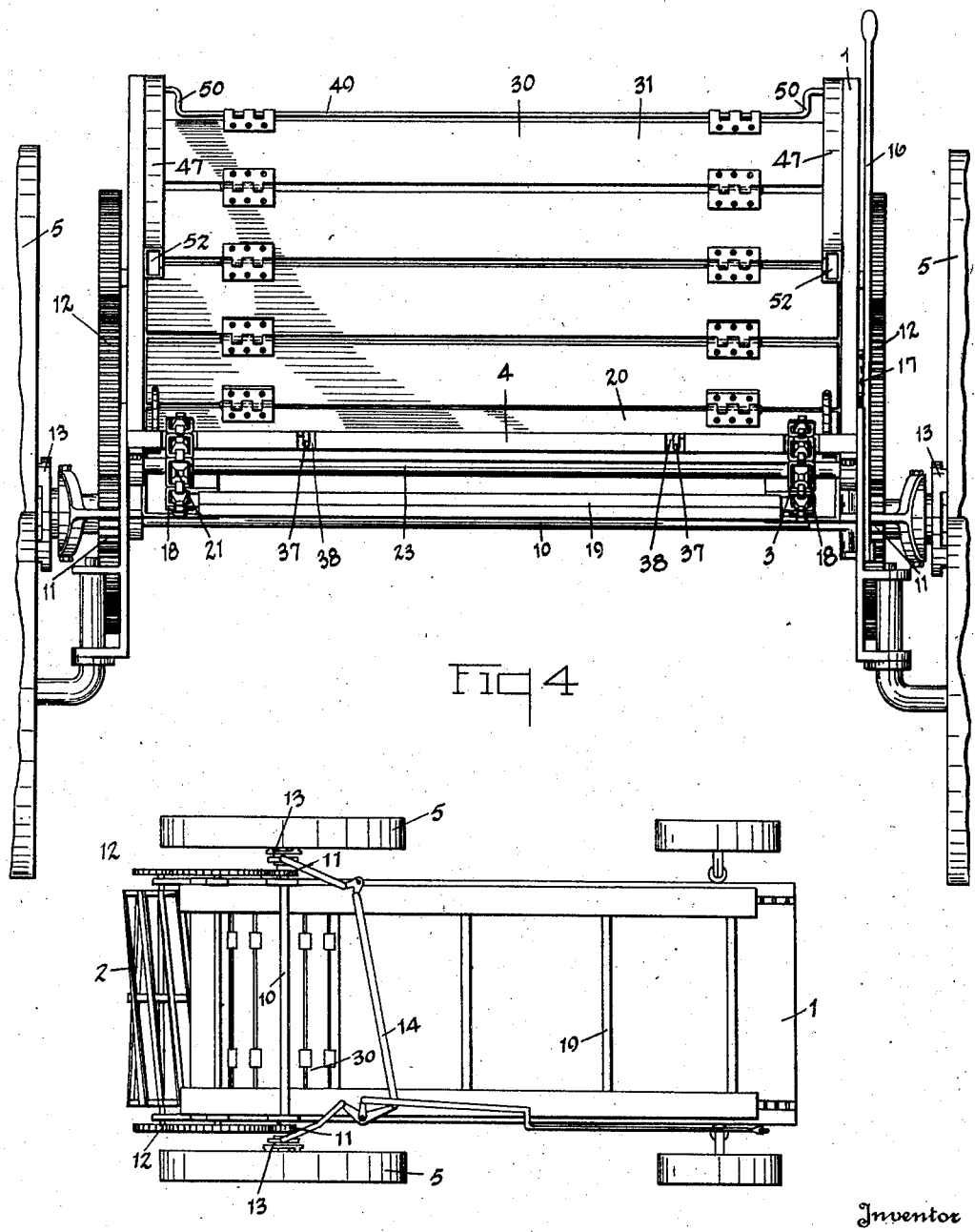

UNITED STATES PATENT OFFICE

RALPH L. GROSE, OF FINDLAY, OHIO

MANURE SPREADER

Application filed April 11, 1928. Serial No. 269,072.

My invention has for its object to provide a gate for automatically closing the forward end of a manure spreader, and which moves with, and is operated by, the spreader belt to eliminate the necessity of manually transposing the gate of the spreader from one end of the spreader to the other end each time the manure is unloaded from the spreader.

As is well known in connection with manure spreaders, an endless belt is provided which operates to continuously move the manure loaded on the spreader towards the spreader wheel or drum. The endless belt and the spreader wheel or drum, are usually driven by the traction of the rear wheels of the spreader. By my invention, I have provided a gate that is adapted to close the forward end of the spreader automatically without making necessary the transfer of the gate at the completion of the unloading or spreading operation to the forward end of the spreader. Thus, by my invention, I have provided an exceedingly efficient manure spreader that greatly reduces the labor required in the spreading operation.

The invention may be contained in manure spreaders that vary in their details of structure and, to illustrate a practical application of the invention, I have selected a manure spreader embodying the invention as an example of the various structures that contain the invention, and shall describe it hereinafter. The manure spreader referred to is shown in the accompanying drawings.

Fig. 1 is a perspective view of the manure spreader looking towards the forward end of the spreader, the draft means being shown disconnected therefrom. Fig. 2 is a broken view of the spreader showing the parts more in detail than shown in Fig. 1. Fig. 3 illustrates a perspective view of a lifting rod for elevating a jointed gate member in position at the forward end of the spreader. Fig. 4 is a front view of the spreader when the gate is raised in position. Fig. 5 is an underside view of the spreader and illustrates the mechanism for operating clutches for interconnecting the spreader mechanism with the wheels of the spreader to obtain the source of power for operating the spreader.

The spreader is provided with the usual box or container 1 wherein the manure is loaded. It also has the usual spreader wheel or drum 2 located on the rear end of the box 1 and at a point to engage the manure as it is delivered to the rear end and spread it by scattering it over the ground in the manner well known in the art. The manure is progressively conveyed to the drum by means of the usual belt 3 that moves over the bottom 4 of the box 1 of the spreader. The drum 2 and the belt 3 are driven by the rear supporting wheels 5 to which they may be connected by any suitable gearing in order to produce rotation of the drum at a desired rate and to move the belt 3 at a desired rate in order to deliver the manure to the drum 2 at a rate that will spread the manure over the desired area.

In the form of construction shown, the rear wheels 5 are rotatably supported on a shaft 10 and a pair of pinions 11, keyed to the shaft 10, mesh with the gear wheels 12. A pair of clutches 13 are located on the shaft 10 and are operated by a suitable link mechanism 14 to connect and disconnect the wheels 5 with the shaft 10 in order to produce rotation of the shaft 10 or to permit the shaft 10 to remain stationary. The link mechanism 14 may be operated by a suitable lever 16 that is pivotally supported, preferably, convenient to the driver or operator of the spreader, the lever 16 being connected to the link mechanism 14 and having a suitable locking segment 17, or rack, for securing it in any position to which it may be moved. The belt 3 is provided with a pair of sprocket chains 18 that are connected together by means of cross bars 19 and 20. The sprocket chains 18 move over the sprocket wheels 21 located on the shafts 22 and 23 and at the ends of the bottom 4 of the spreader. The shaft 22 is supported in suitable bearings located at the rear end of the spreader so as to position the shaft 22 beneath the bottom 4. The gear wheel 12 is connected to the shaft 22 so that rotation of the gear wheel 12 will cause the belt 3 to move over the bottom 4 and convey the manure to the drum 2. The shaft 23 is also supported in suitable bearings located in the forward end of the spreader.

The bars 20 are, preferably, made larger than the cross bars 19 and have connected thereto jointed gates 30. The gates 30 are formed of a plurality of boards 31 that have a length substantially the same as the width of the interior of the spreader so that when the jointed gate is raised to an upright position, it practically closes the forward end of the box 1 of the spreader. The boards 31 are hingedly connected together, the hinges being located on the forward sides of the gates, when the gates are raised, and on the under side of the gates when the gates are lowered. The gates are also hingedly connected to the cross bars 20. The gates are thus moved with the belt 3 and, as each gate reaches the point in the vicinity of the spreading drum 2, it collapses and follows the cross bars 20, to beneath the bottom 4 of the container and is drawn to the forward end of the box or container 1 of the spreader and eventually is carried up over the top of the bottom of the box where the following end of the gate is again lifted to close the forward end of the box of the spreader.

In order to raise the gates at the forward end of the box 1, I have provided a pair of bars 35, each bar having portions located at angles to each other. Each bar has a central portion 36 that provides a means for pivotally supporting the bar, the portion 36 being secured to the under side of the bottom 4 of the box 1 and the portion 37 being movable through openings 38, formed in the bottom 4 of the box. The lengths of the portions 37 and the location of the portions 36 are such as to permit the outer ends of the bars to rest on the shaft 23 which operates to limit the downward swing of the bars 35. The bars 35 are also provided with the inclined portions 39 that are engaged by the ends of the cross bars 20 of the belt 3. The bars 20 are, preferably, of a length sufficient to over-extend the length of the bars 19 and, hence, the bars 19 will not engage the inclined portions 39 of the bars 35. Thus, as the belt 3 is moved over the bottom, the ends of the bars 20 engage the portions 39 of the bars 35 so as to tilt or swing the bars about their pivotal axes extending through the portions 36 of the bars. The portions 37, being located between the sprocket chains 18 raise the jointed gates 30 as their rear ends pass the forward end of the box, by the operation of the cross bars 20 which engage the portions 39 of the rods 35 to swing the portions 37 upward.

The spreader is provided with a means for retaining the gate in this position so that the bars 35 may be returned to their normal position and in such position that they may engage and raise the other or succeeding gate when it arrives in proper position for closing the forward end of the spreader. The rods 35 may be returned to their normal positions by means of springs 45, secured to the underside of the bottom 4 and adapted to operate on the portions 39 to yieldingly press the portions 37 downward to beneath the bottom of the spreader and the portions 39 upward to above the bottom of the spreader so that the portions 39 will again be engaged by the other or succeeding cross bars 20.

The gate 30 is held in its raised position by means of the channeled member 47 having inwardly extending flanges 48. The forward ends of the edges of the flanges are separated a short distance so as to receive the ends of the bar 49 that are pivotally supported on the upper edge of the top board 31 of the jointed gate 30. Preferably, the bar 49 has angularly bent portions 50 which extend upwardly from the upper corners of the upper board 31 of the gate and laterally so as to extend through the opening formed between edges of the flanges 48. The ends of the bar 49 are provided with rollers 51 having dimensions substantially equal to, though somewhat smaller than, the interior dimensions of the channeled members 47. The channeled members 47 are each provided with a mouth 52 formed by flaring the sides of the channels and, consequently, increasing the width of the channels at their forward ends, the width of the flanges 48 remaining substantially the same as in the body portion of the channel member. The mouth 52 of each of the channel bars 47 thus provides a wide opening for reception of the rollers 51 and the ends of the bar 49 of each of the gates 30 when they are raised by the operation of the bars 35. The forward end portions of the channels 47 are also curved so as to permit the upward swing of the gates as they are raised and also permit the forward movement, bodily, of each of the gates as they are carried forward by the belt 3. The channeled members 47 extend the length of the box 1 and thus support the gates 30 in their positions when they are once raised by the bars 35 and, until the gates reach a point in close proximity to the spreading drum 2, and which enables the delivery of all of the manure to the spreading drum without loss thereof.

The rear ends of the channeled bars 47 open on their lower sides, as at 55, so as to permit the rollers 51 and the bars 49 to drop from the channels 47 at the rear end of the box or container of the spreader and follow the bars 20, to which they are connected, to the underside of the bottom 4 of the box. Owing to the jointed character of the parts of the gates that are hingedly connected together, the gates 30 can make the turns about the sprocket wheels 21 on the shafts 22 and 23. A suitable stop 56 is located on the end portions 50 of the bar 49 to limit the angular movements of the end portions 50 relative to the upper board 31 of each gate 30 so that as the gate 30 is raised, the portions 50 of the bar 49 will extend substantially in the plane of the gate and will thus be located with respect to the gate so that the roller 51 will enter the mouth 52 of each of the channel bars 47. Also, in order to prevent the hinged parts of the gates from dragging beneath the lower leg of the belt 3, when they move beneath the bottom 4 of the box 1, means is provided for maintaining the gates substantially in proximity to the portions of the belt in the vicinity of the gates. Thus, the flange members 57 are secured to the under side of the bottom 4 so that its flanges 58 will form a track on which the ends of the boards 31 may slide as the gates 30 are conveyed along the under side of the bottom 4.

Thus, by my invention, I have provided an efficient means for manipulating one or more gate members to close the forward end of a spreader and permit full loading. The particular construction embodying my invention, and described herein, being so constructed that the manure will be fed to the spreader drum at a uniform rate even when the last of the manure, loaded into the spreader, is being spread, owing to the fact that the gate enables a uniform distribution of the load at the forward end of the spreader, as well as at the central part of the spreader. Also, the construction is such that when the load has been spread, a gate will be automatically removed from the point in proximity to the spreader drum and may, by continued operation of the machine, transfer from the rear end of the spreader to the forward end where it may be raised in position to properly contain or hold the manure that is deposited in the forward end of the box of the spreader.

I claim:

1. In a manure spreader having a spreader drum and a box, the combination of a belt for conveying the manure in the box to the spreader drum of the spreader, a collapsible gate connected to the belt, means for moving the belt within the box towards one end of the box, means for raising the gate and means for maintaining the gate in its raised position and for lowering the gate in the vicinity of the spreader drum of the spreader.

2. In a manure spreader having a spreader drum and a box, the combination of a belt for conveying the manure in the box to the spreader drum of the spreader, a collapsible gate connected to the belt, means for moving the belt within the box towards one end of the box, means for raising the gate, and a member extending along each side of the box for engaging the gate to maintain the gate in its raised position.

3. In a manure spreader having a spreader drum and a box, the combination of a belt for conveying the manure in the box to the spreader drum of the spreader, a collapsible gate connected to the belt, means for moving the belt within the box towards one end of the box, means for raising the gate, and channel members adapted to receive parts of the gate for maintaining the gate in its raised position.

4. In a manure spreader having a spreader drum and a box, the combination of a belt for conveying the manure in the box to the spreader drum of the spreader, a collapsible gate connected to the belt, means for moving the belt within the box towards one end of the box, means for raising the gate, channel members adapted to receive parts of the gate for maintaining the gate in its raised position, a channeled member having open ends for receiving the said part of the gate when the gate is raised, and for releasing the said part of the gate when the gate is located in proximity to the spreader drum.

5. In a manure spreader having a spreader drum and a box, the combination of a belt movable over the bottom of the box for conveying the manure to the spreader drum of the spreader, a plurality of collapsible gates connected to the belt, a member operated by the belt for engaging the gates in succession to raise the gates in position to close one end of the box, a pair of channel members, a pair of rollers connected to the gates and adapted to engage in the channel members, the channel members having flaring end portions for receiving the rollers and open ends located in the vicinity of the spreader drum of the spreader for releasing the gate.

In witness whereof I have hereunto signed my name to this specification.

RALPH L. GROSE.